United States Patent
Fuchigami

(10) Patent No.: US 7,373,511 B2
(45) Date of Patent: May 13, 2008

(54) IDENTIFICATION DEVICE, IDENTIFICATION SYSTEM, AND CARD ISSUING DEVICE AND SYSTEM NEEDING IDENTIFICATION

(75) Inventor: Masachika Fuchigami, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 575 days.

(21) Appl. No.: 10/300,884

(22) Filed: Nov. 21, 2002

(65) Prior Publication Data

US 2003/0097560 A1 May 22, 2003

(30) Foreign Application Priority Data

Nov. 21, 2001 (JP) .............................. 2001-355596

(51) Int. Cl.
H04K 9/00 (2006.01)
G06K 5/00 (2006.01)
(52) U.S. Cl. ..................... 713/170; 713/170; 713/155; 713/161; 235/382; 235/380
(58) Field of Classification Search ................ 713/170, 713/155, 161; 235/382, 380
See application file for complete search history.

(56) References Cited

U.S. PATENT DOCUMENTS

| | | | | |
|---|---|---|---|---|
| 3,504,343 A | * | 3/1970 | Ditlow | 235/441 |
| 3,593,292 A | * | 7/1971 | Scott | 340/5.85 |
| 4,471,216 A | * | 9/1984 | Herve | 235/380 |
| 4,582,985 A | * | 4/1986 | Lofberg | 235/380 |
| 5,438,321 A | * | 8/1995 | Bernard et al. | 340/573.4 |
| 5,635,907 A | * | 6/1997 | Bernard et al. | 340/573.4 |
| 5,862,247 A | * | 1/1999 | Fisun et al. | 382/116 |
| 6,058,477 A | * | 5/2000 | Kusakabe et al. | 713/169 |
| 6,141,751 A | * | 10/2000 | Ogawa | 713/170 |
| 6,192,347 B1 | * | 2/2001 | Graff | 705/36 R |
| 6,253,322 B1 | * | 6/2001 | Susaki et al. | 713/170 |
| 6,304,968 B1 | * | 10/2001 | Hacker et al. | 713/153 |
| 6,304,974 B1 | * | 10/2001 | Samar | 726/10 |
| 6,327,659 B2 | * | 12/2001 | Boroditsky et al. | 713/182 |
| 6,443,841 B1 | * | 9/2002 | Rossides | 463/25 |
| 6,516,413 B1 | * | 2/2003 | Aratani et al. | 713/170 |
| 6,564,323 B2 | * | 5/2003 | Takahashi et al. | 713/182 |
| 6,567,915 B1 | * | 5/2003 | Guthery | 713/168 |
| 6,615,352 B2 | * | 9/2003 | Terao et al. | 713/184 |
| 6,681,328 B1 | * | 1/2004 | Harris et al. | 713/175 |
| 6,765,470 B2 | * | 7/2004 | Shinzaki | 340/5.52 |
| 6,799,272 B1 | * | 9/2004 | Urata | 713/171 |
| 6,799,273 B1 | * | 9/2004 | Oishi et al. | 713/171 |

(Continued)

FOREIGN PATENT DOCUMENTS

JP   06-028464   2/1994

(Continued)

Primary Examiner—Emmanuel L. Moise
Assistant Examiner—Techane J. Gergiso
(74) Attorney, Agent, or Firm—Venable, LLP; Michael A. Sartori; Catherine M. Voorhees

(57) ABSTRACT

The device and system of present invention identify the person to be identified according to a result given from certification bureau. These device or system mainly comprises a condition inputting section to input identification condition, a certification inputting section to input specifying information corresponding to the identification condition, a judging section to judge whether the specifying information accords with the corresponding identification condition or not, and a result outputting section to output certification result.

23 Claims, 8 Drawing Sheets

U.S. PATENT DOCUMENTS

| | | |
|---|---|---|
| 6,842,859 B1 * | 1/2005 | Hikita et al. ................. 713/170 |
| 6,845,448 B1 * | 1/2005 | Chaganti et al. ............ 713/166 |
| 6,889,322 B1 * | 5/2005 | Levy ........................... 713/168 |
| 6,934,842 B2 * | 8/2005 | Okamoto et al. ............ 713/168 |
| 7,025,256 B1 * | 4/2006 | Drummond et al. ........ 235/379 |
| 7,165,718 B2 * | 1/2007 | Blancas et al. .............. 235/380 |
| 2002/0026582 A1 * | 2/2002 | Futamura et al. ........... 713/170 |
| 2002/0046144 A1 * | 4/2002 | Graff ........................... 705/36 |
| 2002/0170960 A1 * | 11/2002 | Ehrensvard et al. ........ 235/380 |
| 2003/0135731 A1 * | 7/2003 | Barkan et al. ............... 713/155 |
| 2005/0121514 A1 * | 6/2005 | Hovsepian ................... 235/382 |
| 2005/0165682 A1 * | 7/2005 | Duke ........................... 705/41 |
| 2007/0014397 A1 * | 1/2007 | Ukeda et al. ................. 380/30 |
| 2007/0045407 A1 * | 3/2007 | Paul et al. .................... 235/380 |

FOREIGN PATENT DOCUMENTS

| | | |
|---|---|---|
| JP | 11-102392 | 4/1999 |
| JP | 2001-297285 | 10/2001 |

* cited by examiner

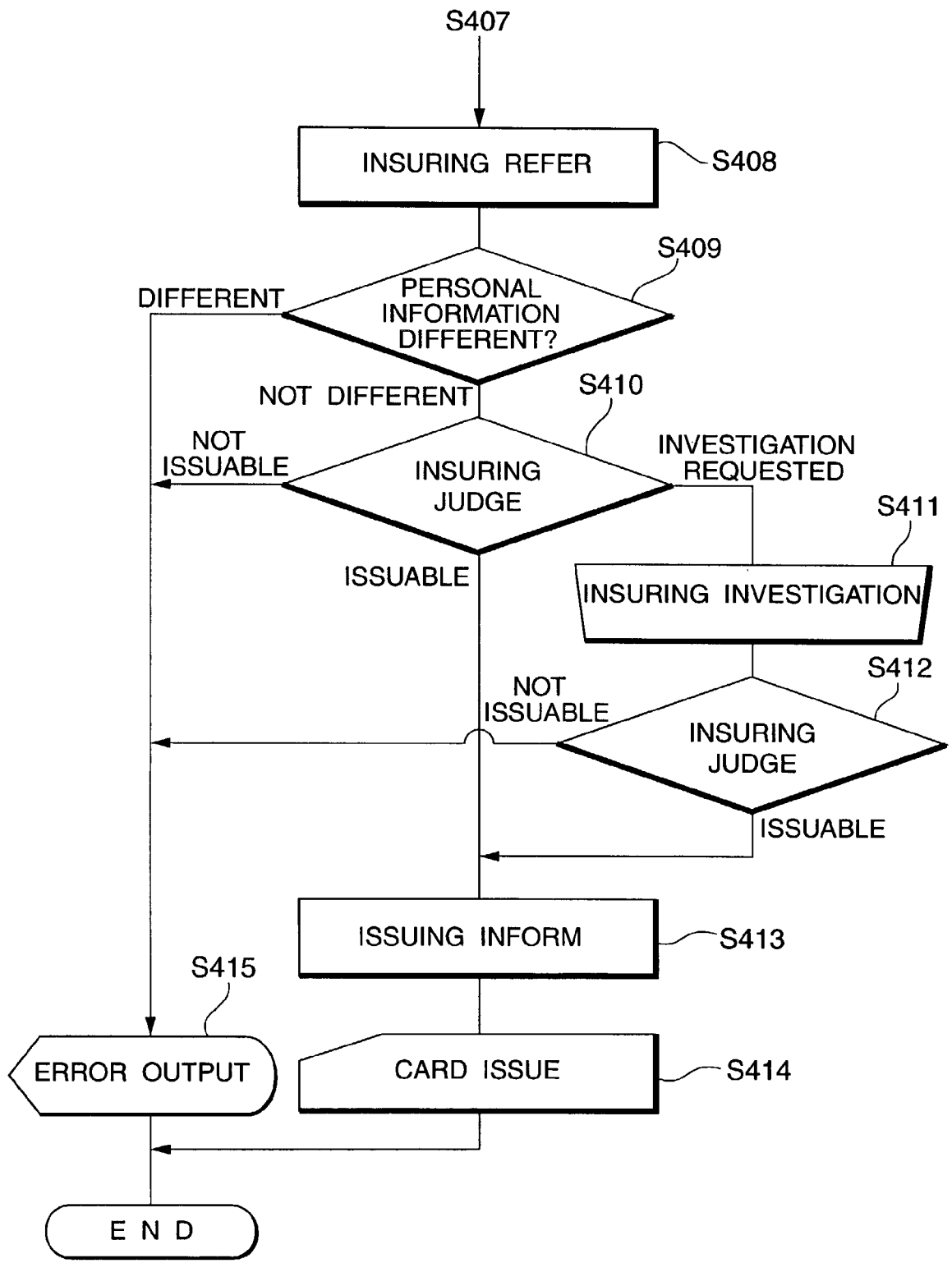

IDENTIFICATION DEVICE, IDENTIFICATION SYSTEM, AND CARD ISSUING DEVICE AND SYSTEM NEEDING IDENTIFICATION

BACKGROUND OF THE INVENTION

1. Field of the Invention

The present invention relates to an identification device, an identification system, and a card issuing device & system which perform identification process of a person.

2. Description of the Related Art

In general, there are two kinds of methods to identify a person. One is a method which uses certificates possessed by the person to be identified. Some examples of these certificates are a car license, passport etc. attached with a photograph of the person to be identified.

Another is a method which uses physical characteristics of the person, either himself or herself. Some examples of these physical characteristics are a fingerprint, a voiceprint etc. of the person.

However, certificates are often fabricated or reconstructed by a person or industry that steals information from another person to create fraudulent documents. So, those cannot afford a satisfactory identification.

On the other hand, the use of physical characteristics disturbs the privacy of the person to be identified. Moreover, fingerprint or voiceprint has often failed to recognize the person to be identified.

By the way, there are various opportunities for identifying people today. A typical example requiring identification is the issuance of a credit card. Other examples of occasions or situations requiring identification are the reissuing a car license, permitting entry into a building (i.e. of a company) and so on. More recently, there is a security need for gaining access to a certain address in a network, such as the Internet.

And the accuracy of identification is different between each of these occasions. For example, to issue a credit card, a high accuracy of identification is needed.

When a credit card is issued, a certificate such as a car license is needed to certify a person who wants a credit card. And, an investigation for insuring by the credit card company is needed.

On the other hand, there are occasions when such high accuracy of identification is not needed. In these occasions, complex identification should be avoided because it costs much for high accuracy identification.

Therefore, a device or system is needed for making identification according to the accuracy request of the identification.

SUMMARY OF THE INVENTION

It is therefore an object of the present invention to provide a device and a system which can afford a satisfactory accuracy or moderate cost for identifying a person to be identified.

1st aspect, an identification device is provided. This device identifies the person to be identified according to at least two certification results of the person to be identified given from at least two certification bureaus. And, this device comprises a condition inputting section specifies an identification condition to request the person to be identified to present at least two certification mediums. It also comprises a certification inputting section into which is inputted medium information obtained from the at least two certification mediums of the person to be identified that should correspond to the identification condition. And, it comprises a judging section which judges whether personal data of the medium information of one certification medium accords with the personal data of the medium information corresponding to another of the at least two certification mediums. And, the medium information is given to the corresponding bureau when the judgement is affirmative.

The device further comprises a result outputting section which outputs each certification result of the person to be identified given from the corresponding certification bureau, with outputting the corresponding identification information. Moreover, the judging section gives charge for identification to the result outputting section.

2nd aspect, an identification system is provided. This system comprises an identification device of 1st aspect and at least one certification bureau connected with the identification device via a network.

3rd aspect, an identification method is provided. This method comprises an assigning process of identification condition and an inputting process of specifying information. And, it comprises a process of judging whether the specifying information accords with the identification condition, a reading process of the address information in the specifying information, and a process of giving the specifying information to the certification bureau of the read address. Besides, it comprises an identifying process of the person to be identified in the certification bureau, and a presenting process of the certification result.

4th aspect, a card issuing device is provided. This device processes card issue when the person has been identified. And, it comprises a certification input section to input the specifying information, a judging section which judges whether a card can be issued or not according to the specifying information, and a card issuing section which issues a card according to the specifying information.

5th aspect, a card issuing system is provided. This system comprises a card issuing device of 4th aspect and an insuring information center which provides an insuring information of each individual person for judging whether a card is issuable or not.

DETAILED DESCRIPTION OF THE PREFERRED EMBODIMENTS

Hereinafter, the embodiments of present invention preferred by the inventor will be described.

The first embodiment of identification device and identification system according to present invention will be described referring to FIG. 1 and FIG. 2.

In Embodiment 1, a person responsible for issuing a document to a person or an identification requesting client offers a certain identification condition to make sure that the person subjected to identification is himself or herself. And, it is judged whether the person to be identified is himself or herself according to the specifying information got from the person to be identified who accepted the identification condition. Embodiment 1 is applied to this occasion.

In Embodiment 1 described is the occasion when the offering of the information about credit cards as the condition of identification.

The whole configuration of a system comprising the identification device according to Embodiment 1 will be described referring to FIG. 1.

Figure 1:
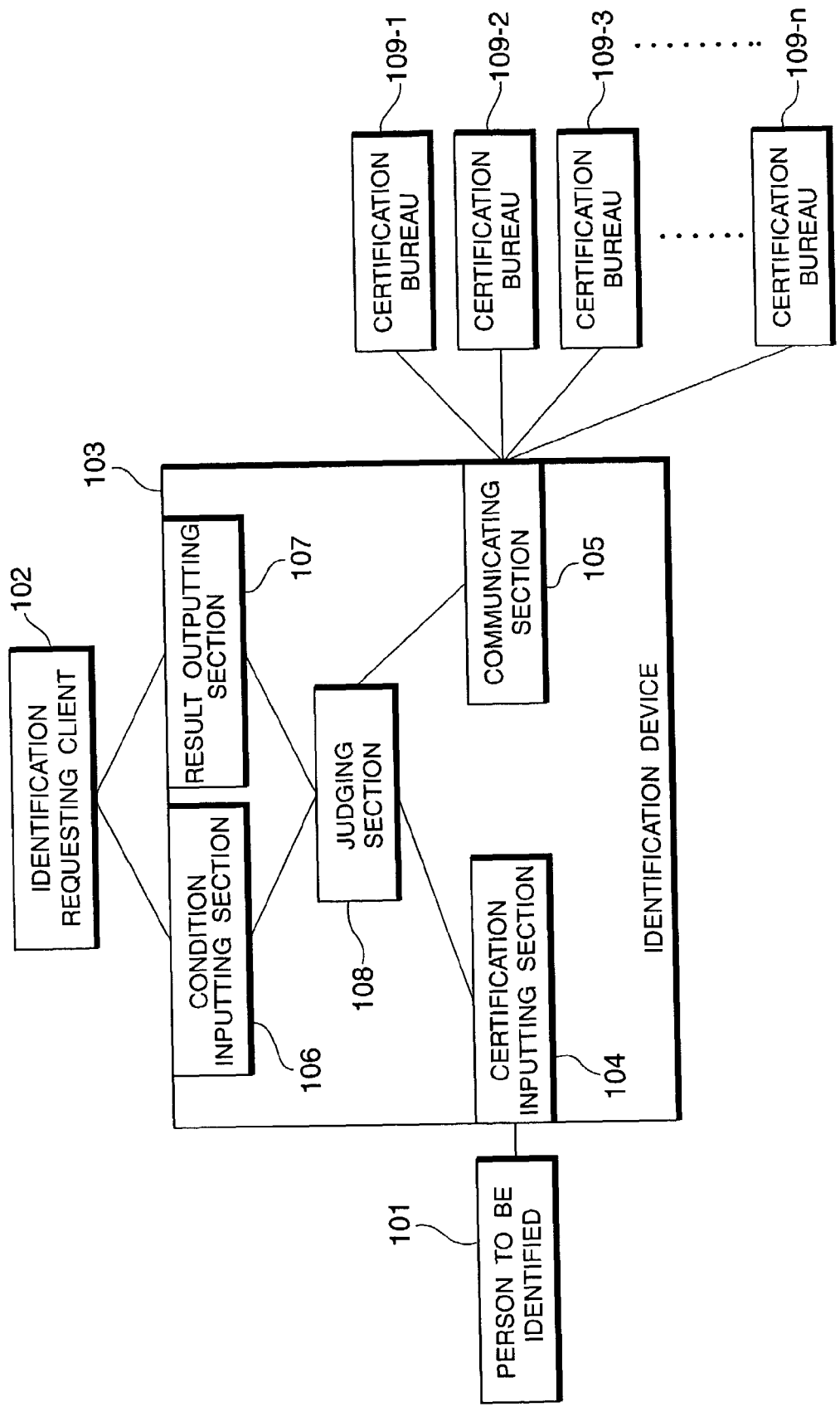
FIG. 1 is a block diagram showing the whole configuration of the system comprising identification device of Embodiment 1 and also showing the internal configuration of the identification device.

In FIG. 1, an identification requesting client 102 judges to make sure that the person to be identified 101 is himself or herself by using identification device 103.

The identification device 103 comprises a certification inputting section 104, a communicating section 105, a condition inputting section 106, a result outputting section 107, and a judging section 108. Moreover, the identification device 103 is connected to each certification bureau 109-1~109-n via e.g. network.

Hereinafter, first of all described is each function of internal sections comprised in the identification device 103.

The condition inputting section 106 is what is inputted an assignment of a certain identification condition to identify the person to be identified 101. And, this identification condition assigned by the identification requesting client 102 is given to the judging section 108 by the condition inputting section 106. This condition assignment of identification is necessary for identification requesting client 102 to make sure that the person to be identified 101 is himself or herself.

For example, the identification requesting client 102 is able to assign "Offering of two credit cards" possessed by the person to be identified 101 as the condition of identification demanded to the person to be identified 101. That is, the condition of identification is not limited to single or one kind of condition but plural or several kinds of condition is able to be set. Moreover, the identification requesting client 102 is able to set the number and kind of the condition corresponding to the object of identification.

The result outputting section 107 is what receives the information to inform the identification requesting client 102, from judging section 108. And, the information is presented by the result outputting section 107. That is, the result outputting section 107 is what presents identification result contents etc. as well as the charge for identification which are received from the judging section 108. The judging section 108 has a table to refer the charge for identification or total charge for plural identification corresponding to the condition assignment for identification with identification device 103 used by identification requesting client 102. Therefore, the identification requesting client 102 is able to make some decision referring to the result of identification and make payment for the charge presented by the result outputting section 107.

Here, in FIG. 1, the condition inputting section 106 and the result outputting section 107 are shown to be made up by separate configuration. But, they can be made up in unit configuration having both functions of them.

Specifying information of the person by the person to be identified 101 is input to the certification inputting section 104 And, the certification inputting section 104 gives the inputted specifying information to the judging section 108.

For example, the certification inputting section 104 is equipped with a card reader and a number input button. It receives the information recorded in a credit card of the person to be identified 101 via the card reader. And, it receives the password number of the credit card inputted by the person to be identified 101. (Hereinafter, the information of credit card and its password are called the specifying information).

The judging section 108 is what judges whether the specifying or medium information inputted by the person to be identified 101 by certification inputting section 104 agrees with the condition of identification input by condition inputting section 106, or the specifying information is true etc. For example, when two credit cards or two certification mediums offering is assigned for the condition of identification, it is judged whether two credit cards are inserted by the person to be identified 101, or the name or personal data etc. registered in the credit cards are respectively true. The judging section 108 is what gives the judging result to the result outputting section 107.

Moreover, the judging section 108 is what selects a certification bureau in order to certify according to the specifying information of the person to be identified 101 which is given to the communicating section 105, when the condition of identification is judged to be satisfied with the specifying information as a result of the judgement mentioned above. For example, according to the card number registered in the credit card, the card issuing company corresponding to it is selected. (For another example, if the specifying or medium information is that of cash card (certification medium), according to the bank number and branch number, the bank and its certain branch corresponding to them are selected.)

Moreover, the judging section 108 is what receives the result certified by certification bureau 109-1~109-n via communicating section 105 and gives it to the result outputting section 107.

The communicating section 105 is connected with certification bureau 109-1~109-n via network. And, it is equipped with function module of processing communication. The communicating section 105 receivers from judging section 108 the specifying information of the person to be identified 101 satisfying the condition of identification which is transformed in the communication format to be sent to either of the certification bureau 109-1~109-n selected by the judging section 108. Moreover, the communicating section 105 receives certification result from certification bureau 109-1~109-n to send it to the judging section 108.

The certification bureau 109-1~109-n receives specifying information of the person to be identified 101 via communicating section 105. And, it certifies that the person to be identified 101 is true according to the specifying information given. For example, each certification bureau 109-1~109-n selected by the judging section 105 certifies that the person to be identified 101 is himself or herself according to the information of the credit card number or password number etc. given by the person to be identified 101.

Figure 2:
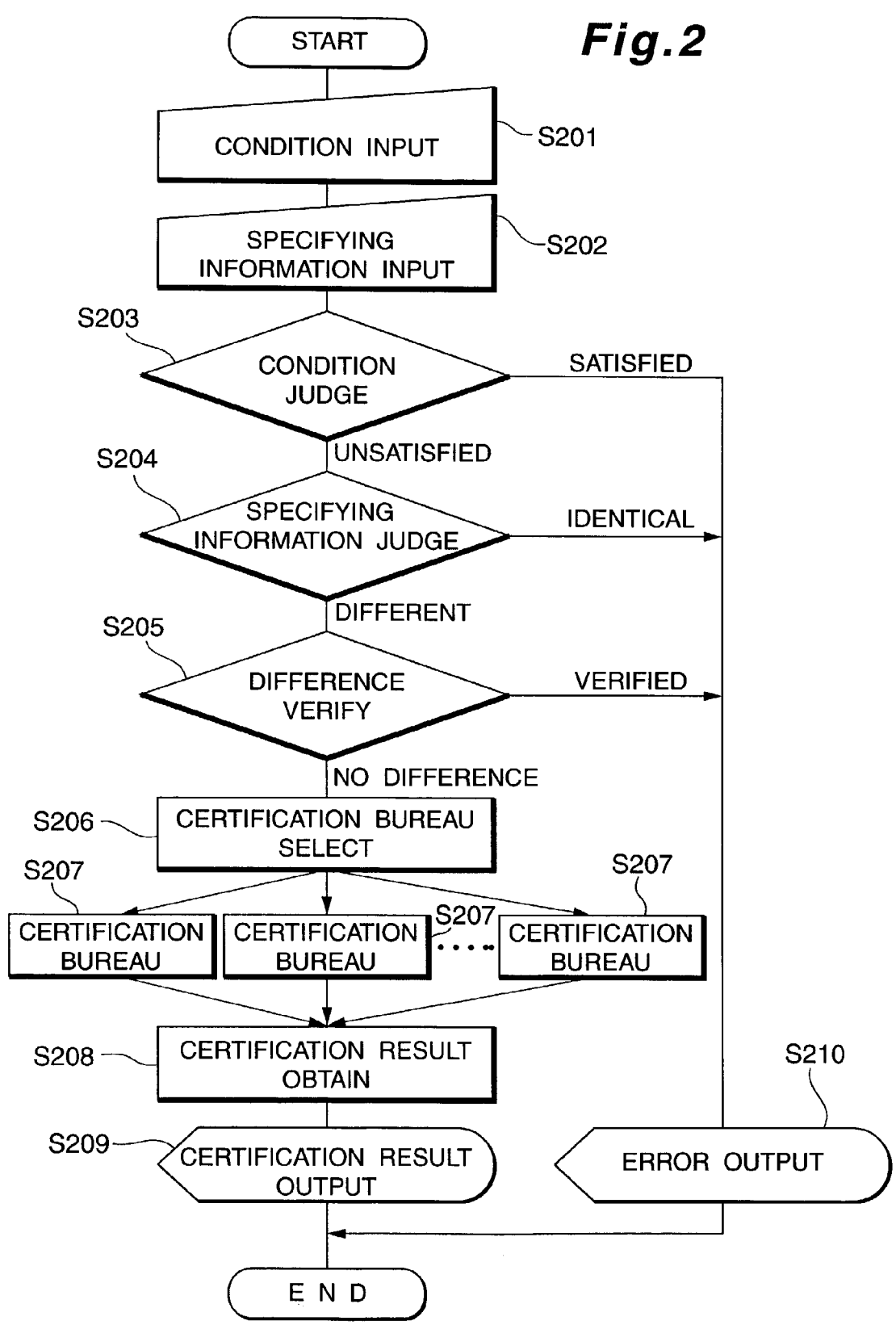
FIG. 2 is a flow-chart showing the process of identification method of Embodiment 1.

Next, the operation of identification device and its system according to Embodiment 1 is described referring to the flow-chart of FIG. 2.

First of all, an identification requesting client 102 sets information with condition inputting section 106 to assign the condition for identification (S201). The assigned condition of identification is given to judging section 108. For example, the condition of identification is assigned to "Two credit cards offering".

In the judging section 108, calculating the amount of charge and total amount of charge corresponding to the condition of identification, they are presented at the result outputting section 107. The presented charge amount etc. is referred by the identification requesting client 102 for his or her own judgement. In this occasion, the charge amount and total charge amount corresponding to assigned condition of identification presented are set in advance in the judging section 108. For example, the number or kind of the condition of identification is set in advance.

When the charge amount is accepted by the identification requesting client 102, the confirmation is inputted. Then, the process goes to next step (S202). When not accepted, the process is started again from the first step (return to S201).

Next, the specifying information is inputted into the certification inputting section 104 by the person to be identified 101 who is the identification subject (S202). And, the inputted specifying information is given to the judging section 108. For example, a credit card of the person to be identified 101 is inserted into the card reader not shown in the drawings. And, corresponding password number etc. is inputted. After this process, the information of the credit card and its corresponding password number etc. (specifying information) are given to the judging section 108.

In the judging section 108, the specifying information given from the person to be identified 101 is judged whether it accords with the condition of identification of the identification requesting client 102 (S203). For example, it is judged whether the information of two credit cards is inputted according to the assigned condition of the identification requesting client 102.

The specifying information of the person to be identified 101 which is judged to accord with the condition of identification of the identification requesting client 102 at S203 is judged to be independent proper information in the judging section 108. For example, it is judged whether each of the first and second credit card which information inputted is issued independently from different source that is not identical or not. In addition, when the condition of identification of identification requesting client 102 is a single one, the judgement at S204 is not processed, and the process proceeds to the next step soon after a single specifying information is inputted by the person to be identified 101.

The specifying or medium information of the person to be identified 101 which is judged to be independent proper information at S204 is verified that each of the information is not different (S205). For example, it is verified that the information or name (personal data) etc. contained in each of the two credit cards are not different from each other. In addition, when the condition of identification of identification requesting client 102 is a single one, the verification at S204 is not processed, and it is regarded as not different.

Moreover, the specifying information of the person to be identified 101 which is not accord with the condition of identification of identification requesting client 102 at S203, S204 and S205 is regarded as an error. And, each error content is put out to the result outputting section 107.

In this way, judged in the judging section 108 each of the specifying or medium information of the person to be identified 101 is used at the next step. The address information of a certification bureau (bureau data) included in the specifying or medium information is read. And, one of the certification bureau 109-1~109-$n$ is selected according to the address information (bureau data) to make identification of the person to be identified 101 (S206). That is, for example, a credit card issuing company is selected according to a credit card number as address information (bureau data) of certification bureau.

After one of certification bureau 109-1~109-$n$ is selected, the specifying information is given to the communicating section 105. And, whether the communication line connected to the selected certification bureau 109-1~109-$n$ is usable or not is inspected in the communicating section 105. If it is usable, the specifying information is given to the corresponding certification bureau 109-1~109-$n$ via it (S207).

On the other hand, if the communication line is not usable (if it is unusable), the evidence is presented at the result outputting section 107.

In each of certification bureau 109-1~109-$n$, the identification of the person to be identified 101 is processed according to the specifying information given. And, the certification result is given to the judging section 108 via communicating section 105.

The certification result given to judging section 108 is given to the result outputting section 107 (S209). And, the identification requesting client 102 makes confirmation of identification according to the certification result presented. Thus, the identification of the person to be identified ends.

As mentioned above, according to Embodiment 1, the identification is able to be processed easily, safely and exactly according to credit cards etc. possessed usually by the person to be identified 101 or the information only known by the person to be identified 101, being equipped with the identification device 103.

Moreover, according to Embodiment 1, the identification requesting client 102 is able to assign the condition needed for identification corresponding to the number or kind of certification that is exactness or accuracy of certification. And, the client is able to adjust accuracy of identification to time and cost of certification easily.

Besides, as a result of these, the identification condition is able to be assigned corresponding to the accuracy of identification. And, the specifying information is verified by the memory of the person, either himself or herself. Therefore, it becomes difficult for others to get identification in the disguise of another person.

Figure 3:
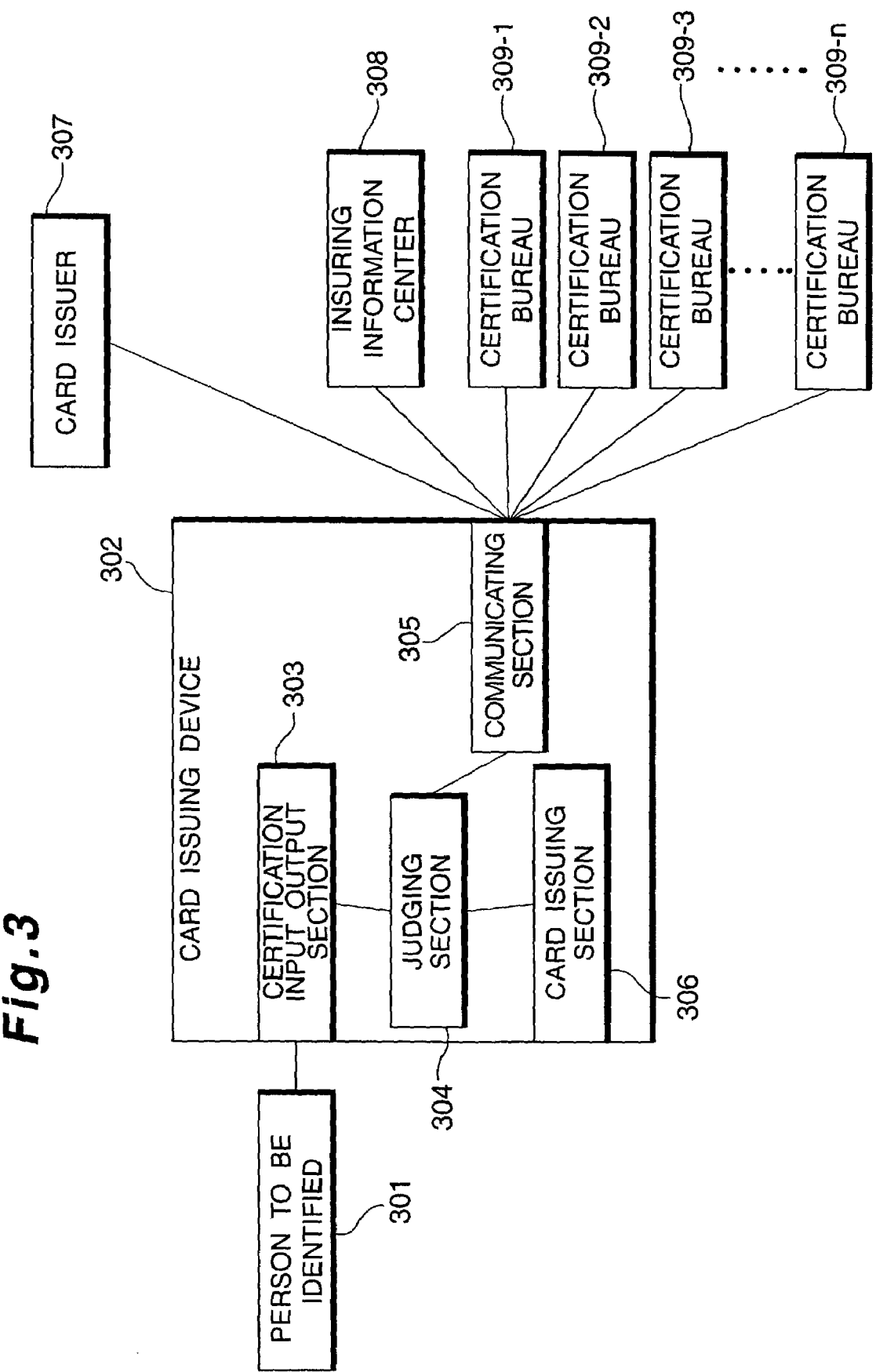
FIG. 3 is a block diagram showing the whole configuration of the system comprising identification device of Embodiment 2 and also showing the internal configuration of the identification device.

Next, the embodiment of card issuing device and its system according to present invention is described referring to FIG. 3 and FIGS. 4(*a*) and (*b*).

Embodiment 2 relates to a device which processes card issue when the person has been identified as himself or herself, as a result of the identification process according to the specifying information about the person to be identified who is the card certificate issue requesting client.

As for Embodiment 2, the specifying information is described as a cash card possessed by the person to be identified.

The whole configuration of a system equipped with a card issuing device according to Embodiment 2 is described referring to the block diagram of FIG. 3.

As shown in FIG. 3, a system equipped with a card issuing device of Embodiment 2 comprises a card issuing device 302 operated by a person to be identified 301, and connected to a card issuer 307, an insuring information center 308 and certification bureau 309-1~309-$n$.

To begin with, the internal configuration of the card issuing device 302 is described.

The card issuing device 302 comprises a certification input output section 303, a judging section 304, a communicating section 305, and a card issuing section 306.

The certification input output section 303 is what is equipped with the function to input the specifying information by the person to be identified 301 and to output the presentation of the result of the identification etc. The certification input output section 303 is equipped with for example a card reader, a password number input button and a display. And, the person to be identified 301 is able to process card issuing.

The judging section 304 is what is equipped with the function of judging the justice of the identification with card issuing device 302 and the specifying information about certification. And, it is equipped with the same function as the judging section 108 in Embodiment 1. Moreover, judging section 304, being different from the judging section 108 in Embodiment 1, is what judges whether a card can be issued or not according to the specifying information and the insuring information of the person to be identified 301 which is obtained from the insuring information center 308 via communicating section 305. When it is judged that a card can be issued, the judging section 304 gives the card issuing section 306 the specifying information needed for card issuing as well as the indication of card issuing.

In this occasion, some kinds of processes are set in advance corresponding to each insuring information obtained for the insuring judgement. For example, in the occasion that the insuring information relates to that of credit card gained by the person beforehand, each process is set in advance corresponding to each pattern of existence of delayed payment record such as more than three month delay, within three month delay or without any delay.

The card issuing section 306 is what is equipped with the function of making cards according to the specifying information needed for issuing cards and given from the judging section 304. And its operation is processed according to the card issuing indication of the judging section 304.

The communicating section 305 is what is connected to the card issuer 307, the insuring information center 308 and certification bureau 309-1~309-n.

Such an internal configuration like this is installed in the card issuing device 302. And, as mentioned above, it is connected via network to the card issuer 307, the insuring information center 308 and the certification bureau 309-1~309-n. Needless to say, the certification bureau 309-1~309-n has the same function as the certification bureau 109-1~109-n of Embodiment 1. So, its description is omitted here.

The card issuer 307 is what manages the card issuing. For example, it is a credit card issuing company when the card issued is a credit card.

The insuring information center 308 is what provides an insuring information of each individual person to be identified 301. For example, it can be a certain body which independently possesses individual insuring information, an insuring station of the credit issuing company mentioned above, or some other center. It does not matter which center is connected.

Here, insuring information must be each individual information of the person to be identified. And, it means information which includes each person's bad conduct data such as delayed payment records as well as the least specifying information such as the name of each persons.

In addition, plural insuring information centers can be connected with the card issuing device 302, though a single center is described to be connected in FIG. 3.

Figure 4A:
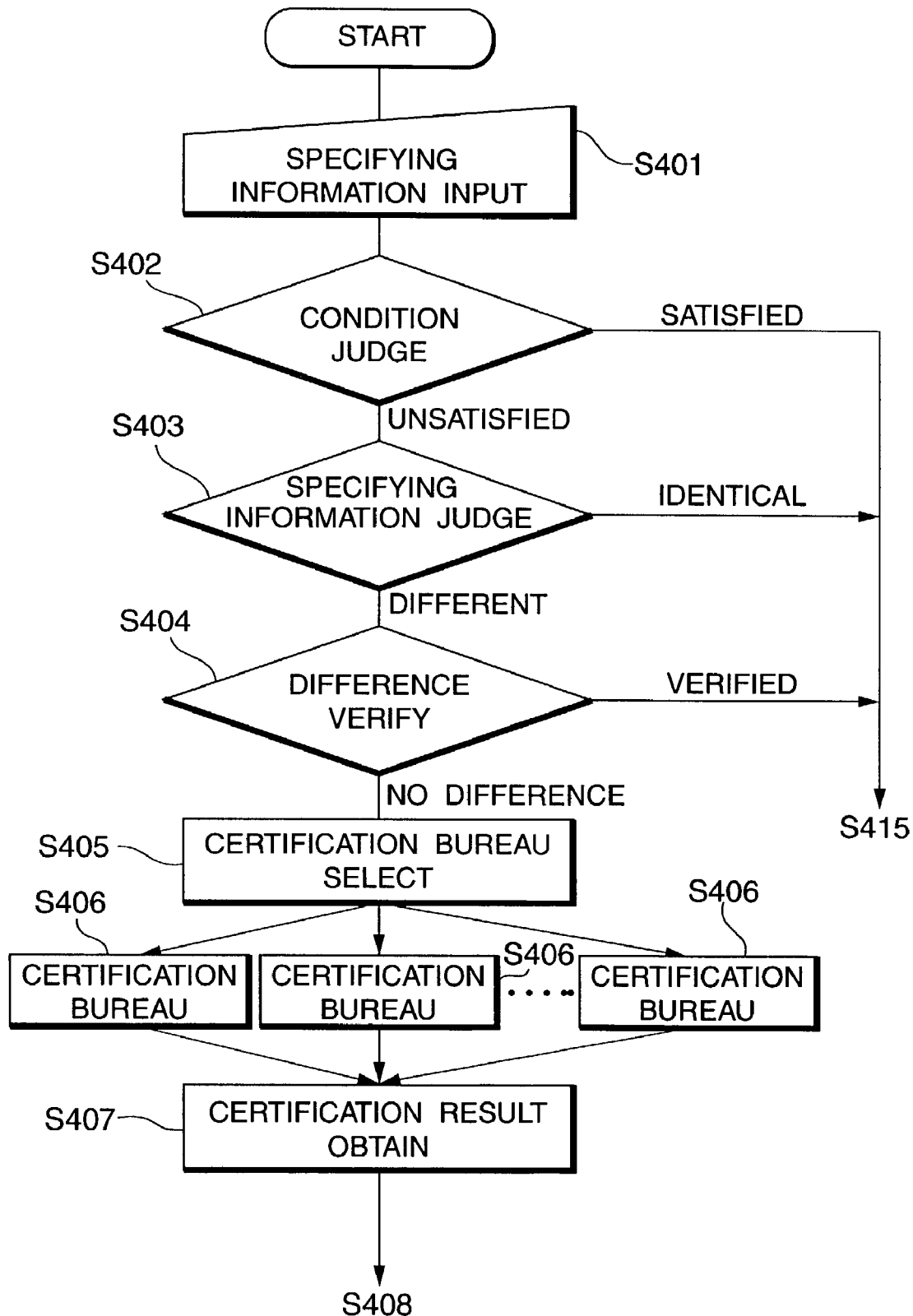
FIGS. 4(*a*) and 4(*b*) are a flow-chart showing the process of identification method of Embodiment 2.

Hereinafter, with reference to the flow-chart of FIGS. 4(a) and (b), described is the operation of card issuing process when the card issuing device is set in advance for demanding identification of card issuing as a cash card of the person to be identified. Here, as for the operation of identification process, the same points as those of identification according to Embodiment 1 is described briefly.

To begin with, a person to be identified 301 at certification input output section 303 inserts his or her cash card into a card reader not shown in the drawings and input the password number of the cash card, each of which is as specifying information (S401).

The inputted specifying information is given to the judging section 304. The inputted specifying information in the judging section 304 is judged whether it satisfies the condition of identification set in advance there (S402).

Moreover, when plural identification conditions are set, a judgement about each kind of specifying information (S403) and a verification of the absence of difference between each kind of specifying information (S404) are processed as well as Embodiment 1, though Embodiment 2 deals with the identification condition of a single cash card.

The specifying information judged in this way is processed as next. The certification bureau 309-1~309-n to make identification of the person to be identified 301 is selected according to the address information of certification bureau included in the specifying information (S405). And, the specifying information is given to the corresponding certification bureau 309-1~309-n via communicating section 305 (S406).

In each certification bureau 309-1~309-n, according to the specifying information given, the identification of the person to be identified 301 is processed. And, the certification result is given to the judging section 304 via communicating section 305 (S407).

In this way, the judging section 304 obtains the specifying information of the person to be identified 301 and the certification result of the person to be identified 301.

Next, described is the operation process until a card is issued according to the insuring information which is obtained by the judging section 304 to issue a card for the person to be identified 301.

The information about the person to be identified 301 (name, address, individual ID number, etc.) included in the specifying information of the person to be identified 301 is given to the insuring information center 308 by the judging section 304 via communicating section 305 (S408).

In the insuring information center 308, the given information about the person to be identified is certified and investigated by it. As a result, the insuring information of the person to be identified 301 is obtained. And, the insuring information of the person to be identified 301 is given to the judging section 304 via communicating section 305.

The judging section 304 makes sure that the given insuring information of the person to be identified is really the information of the person, either himself or herself according to the specifying information of the person to be identified 301 (S409). That is, it makes sure that the given insuring information is right as the insuring information of the actual person to be identified 301.

When the judging section 304 made sure of the given insuring information, each corresponding process programmed in advance is executed according to the contents of the insuring information (S410 and S411).

In Embodiment 2 to be described, three corresponding processes are ready in advance according to the insuring information contents.

These three corresponding processes are "Do not issue any card", "Investigate the person again" and "Issue a card". Hereinafter, each corresponding process is described one after another.

First of all, when the insuring information includes data indicating that any card is apparently not able to be issued, the corresponding process of "Do not issue any card" is performed in the judging section 304. For example, when the payment data of the credit card which is already possessed by the person to be identified 301 indicates that he or she is in arrears with the payment for more than three months, any card is not issued for the person to be identified 301, and the fact is presented at the certification input output section 303.

Next, when the insuring information includes data indicating that any card is not able to be issued, the corresponding process of "Investigate the person again" is performed. In such an occasion like this, the insuring the person again" is performed. In such an occasion like this, the insuring information and the specifying information of the person to be identified 301 are given to the card issuer 307 via communicating section 305. And they are investigated by the card issuer 307 (S411). Moreover, even if any card is not able to be issued as mentioned above, a card is able to be issued according to the insuring investigation result by the card issuer 307. Thus, the insuring investigation result by the card issuer 307 is given to the judging section 304 via communicating section 305. And, it is decided whether a card is issued or not according to the insuring investigation result (S412).

Moreover, the insuring information does not include neither the date of "Do not issue any card" nor "Investigate the person again", the corresponding process of "Issue a card" is performed. In this occasion, the specifying information of the person to be identified 301 is given to the card issuing section 306 as well as the card issuing indication to the card issuing section 306 (S413). And, a card is issued by the card issuing section 306 according to the specifying information (S414), so as to finish the card issuing process.

As mentioned above, according to Embodiment 2, the same effect as Embodiment 1 is obtained.

That is, according to Embodiment 2, it becomes difficult for others to disguise as the person to be identified 301. Therefore, a card is able to be issued more securely.

Besides, the corresponding processes are ready in advance according to the insuring information given from the insuring information center 308. Therefore, the procedure relating to the card issuing becomes to be performed faster and more easily.

Hereinafter, Embodiment 3 of the identification device and its system according to present invention is described referring to FIG. 5 and FIGS. 6(a) and (b).

Embodiment 3 is intended to make identification of the person to be identified who belongs to an enterprise.

Figure 5:
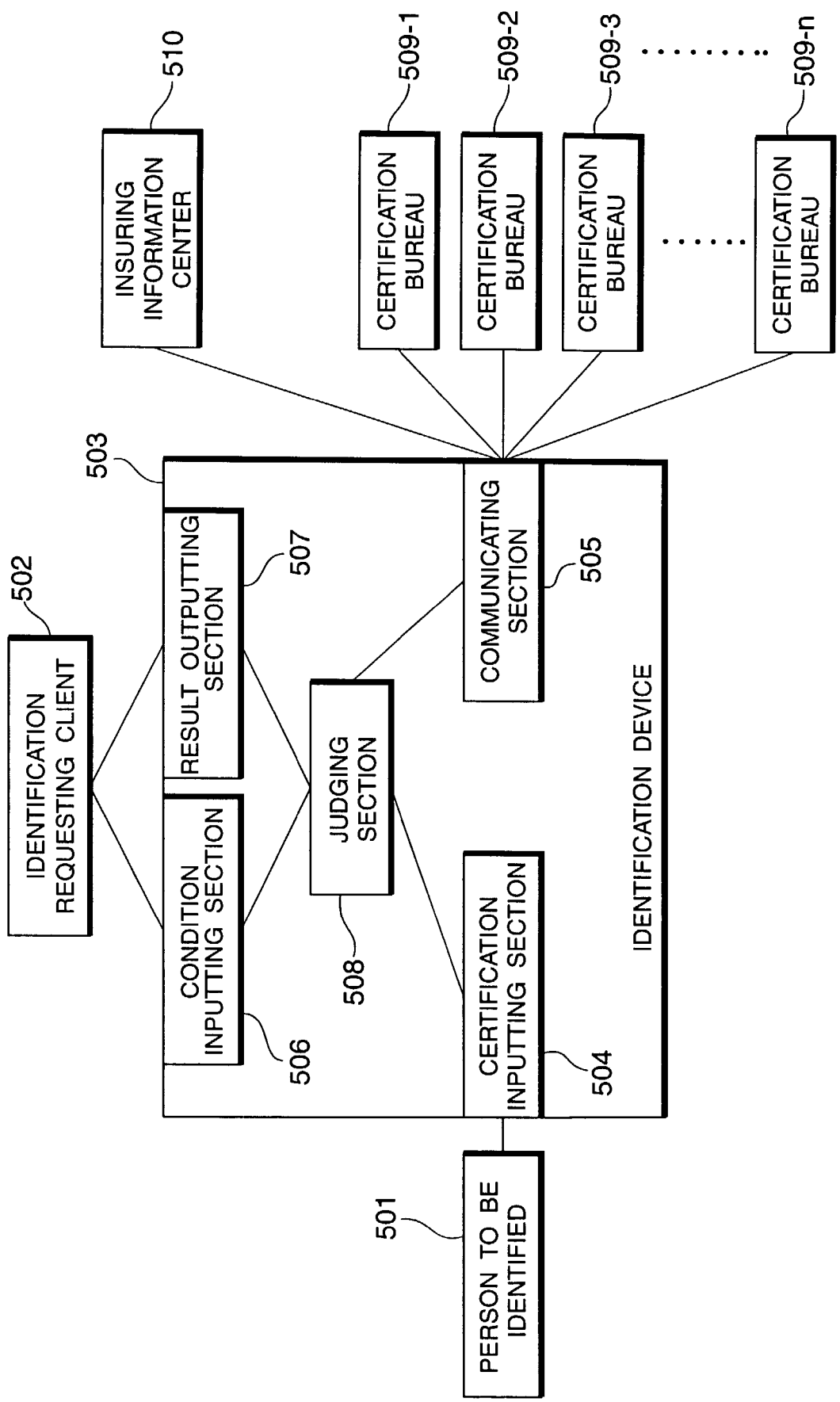
FIG. 5 is a block diagram showing the whole configuration of the system comprising identification device of Embodiment 3 and also showing the internal configuration of the identification device.

The whole configuration of a system equipped with an identification device according to Embodiment 3 is described referring to the block diagram of FIG. 5.

As shown in FIG. 5, the identification device 503 of Embodiment 3 is equipped with the same internal configuration as the identification device 103 of Embodiment 1. And, the corresponding element of the configuration is designated with the corresponding number. So, the description of the common function of the corresponding configuration elements are omitted. And, the function which is different from that of Embodiment 1 is described.

Moreover, the system used the identification device 503 of Embodiment 3 is different from the system of Embodiment 1 in the point that the device is connected to an insuring information center 510 as shown in FIG. 5.

Hereinafter, first of all, the points of the internal configuration of identification device 503 which are different from the identification device 103 of Embodiment 1 are described.

The certification inputting section 504 is what is inputted the specifying information of the person to be identified 501 for issuing a credit card. But, the different point from Embodiment 1 is that it is inputted with the information of a company card of the person to be identified 501 and its password number. And, the certification inputting section 504 is what gives these received information of company card of the person to be identified 501 and its password number to the judging section 508. Here, a company card means a card of a company where the person to be identified 501 belongs to.

The judging section 508 receives the specifying information and the information of company card. And, it gives the specifying information of the person to be identified 501 to the insuring information center 510 via communicating section 505. Moreover, it receives the information of the company where the person to be identified 501 belongs to via communicating section 505. And, it judges whether the person to be identified 501 really belongs to the company according to the information about the company and the information of the company card which are received by it.

Next, the insuring information center 510 receives the specifying information of the person to be identified 501 via communicating section 505. And, it investigates about the company where the person to be identified 501 belong to according to the received specifying information. Moreover, the insuring information center 510 gives the investigation result of the company of the person to be identified 501 to the judging section 508 via communicating section 505.

Figure 6A:
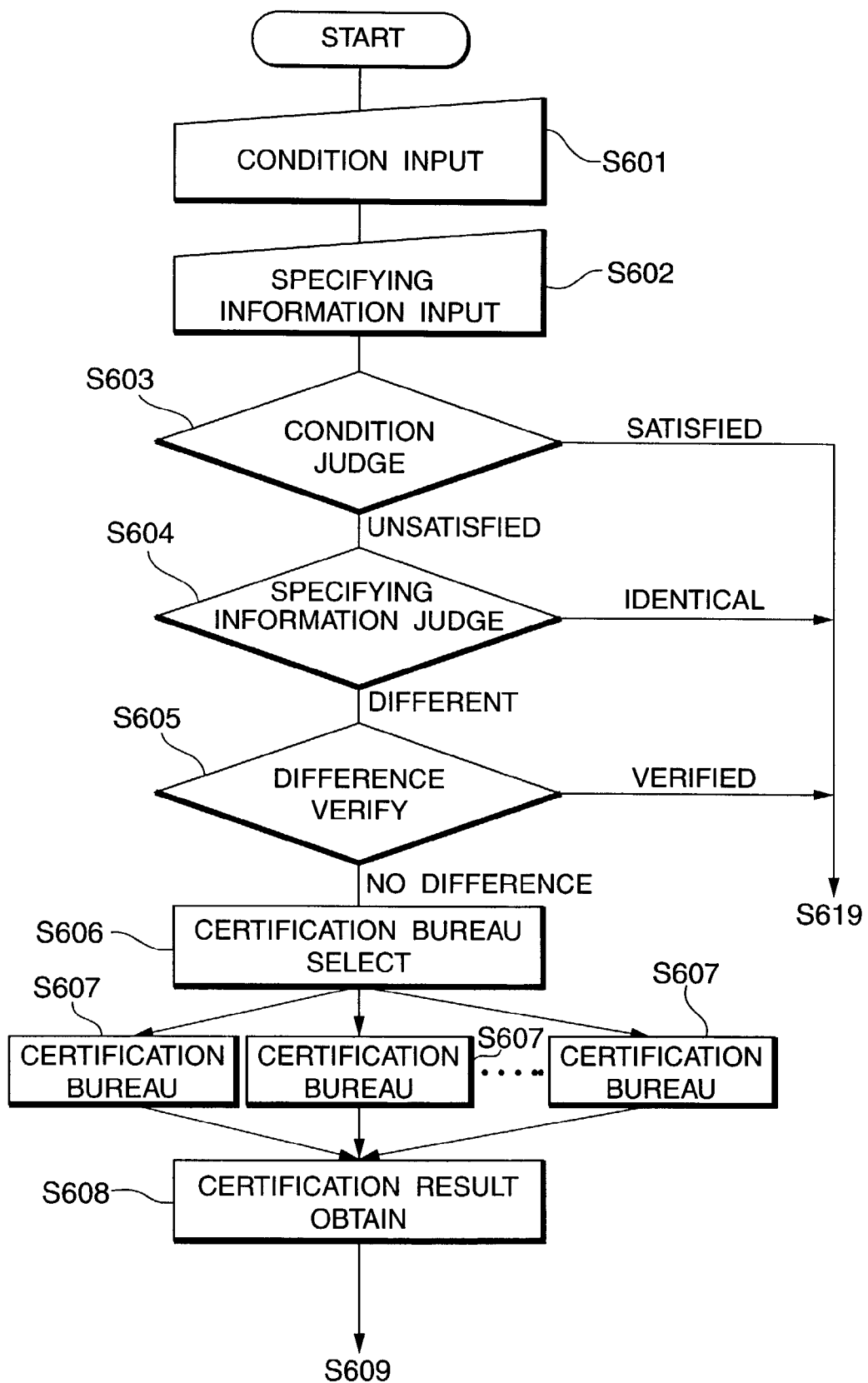
FIGS. 6(*a*) and 6(*b*) are a flow-chart showing the process of identification method of Embodiment 3.
Figure 6B:
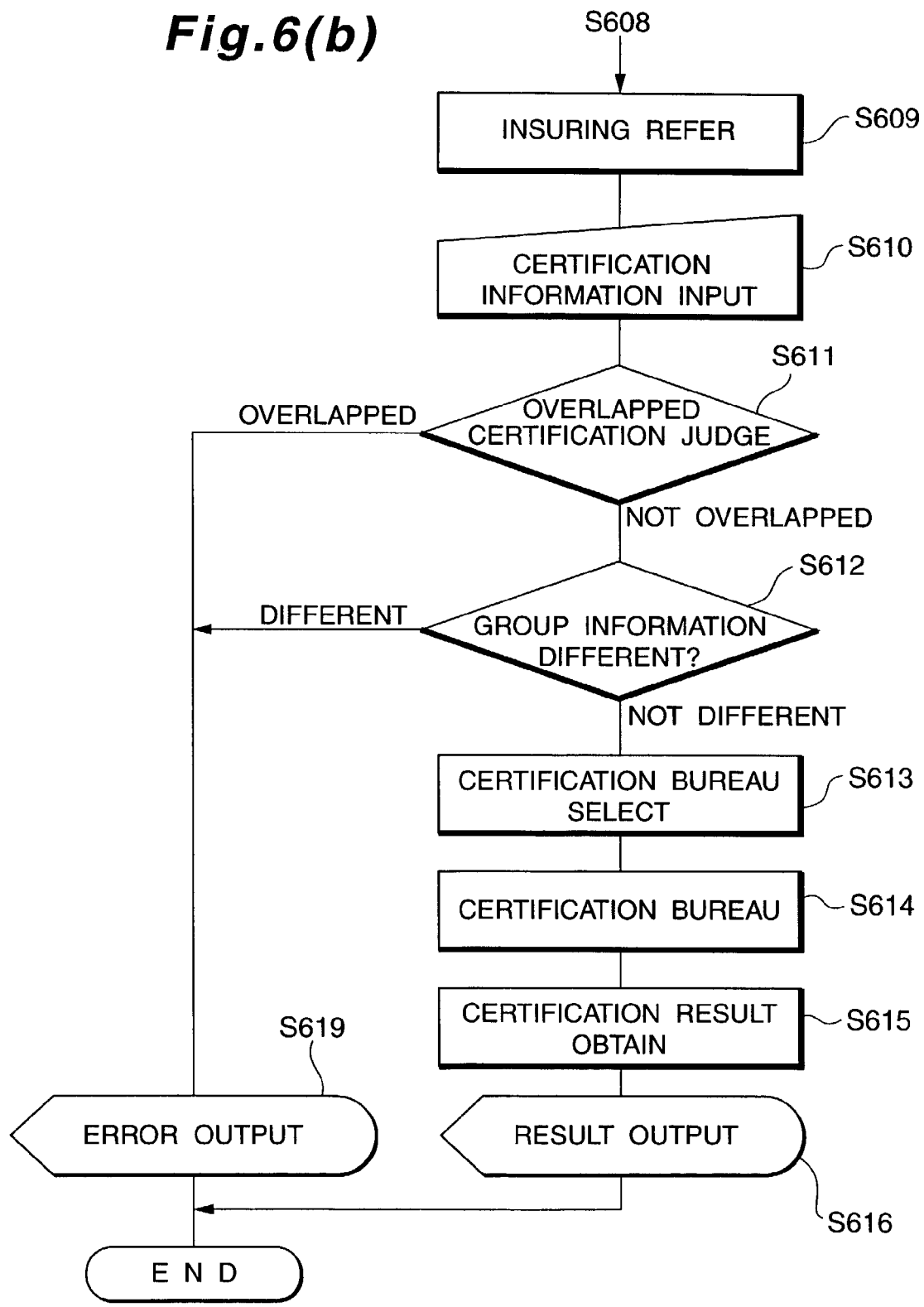

With reference to the flow-chart of FIGS. 6(a) and (b), the operation of Embodiment 3 is described. An identification requesting client 502 assigns the condition of identification (S601). And, the person to be identified 501 inputs the specifying information according to the condition (S602). After this, it is judged whether the condition of identification is satisfied or not according to the assigned condition of identification and the inputted specifying information (S603~S605). Moreover, the certification process of the person to be identified 501 by the certification bureau 509-1~509-n which is selected by the judging section 508 is same as Embodiment 1 (S606~S608). So, further description is omitted.

The specifying information of the person to be identified 501 is given by the judging section 508 to the insuring information center 510 via communicating section 505. And, the information about the company of the person to be identified 501 is obtained according to given specifying information of the person to be identified. And, the obtained company information is given to the judging section 508 via communicating section 505 (S609).

At the certification inputting section 504, the information of the company card and its password number are inputted by the person to be identified 501. And those company card information and its password number are given to the judging section 508 (S610).

At the judging section 508, it makes sure that the given company card information is right or not (S611). For example, the fact that instead of the company card, other kind of card (credit card etc) is not inserted is confirmed. In this occasion, when it is judged that the company card is not right, the fact is presented at the result outputting section 507 as an error.

When the company card is judged to be right, the company name data is read from the given company card information at the judging section 508. And, the company name data is judged whether it accords with the company information from the insuring information center 510 (S612). In this occasion, when the company name does not accord with the company information, the fact is presented at the result outputting section 507 as an error.

When the company name data accords with the company information, the certification bureau 509-1~509-n is selected by the judging section 508 to certify that the company card is right according to the address information of the certification bureau included in the company card information. And, the company card information is given to the selected certification bureau 509-1~509-n (S613). Here, the certification bureau which certifies the company card and the certification bureau which certifies the specifying information of the person to be identified 501 are respectively able to certify each information. And, it does not matter whether they are same certification bureau or different certification bureaus.

The company card information is certified by the certification bureau 509-1~509-n. And, the certification results are given to the judging section 508 via communicating section 505 (S615).

Both certification results obtained respectively by the judging section 508 according to the specifying information of the person to be identified 501 (S608) and the company card of the person to be identified 501 (S615) are respectively presented at the result outputting section 507 (S616).

At the end of these processes, the judgement of identification of the person to be identified 501 is made according to both certification results by the company card and the specifying information of the person to be identified 501.

As mentioned above, according to Embodiment 3, the same result as Embodiment 1 is obtained.

Moreover, according to Embodiment 3, unfair use of the device by the person outside of the company is prevented because the identification of the person to be identified 501 is made according to the specifying information and the company card information of the person to be identified 501.

Although it is described that the specifying information and the condition of identification of the person to be identified 101, 301 and 501 are embodied in a credit card or a cash card etc. in Embodiments 1~3 mentioned above, the present invention is not limited to these, but it is widely applied to the information which is known only by the person to be identified 101, 301 and 501.

As an example of the occasion when the information only known by the person to be identified 101, 301 and 501 is applied, there is an occasion when the person would like to connect to the address in the network such as the internet etc. where the person intends access, and where an identification of the user is required.

Moreover, it is described that all of the actual certification of the person to be identified 101, 301 and 501 is performed by outside certification bureau. But, the identification requesting clients 102 and 502 themselves may make a part or all of the certification, in the view point of giving satisfactory result of the certification of the person to be identified. That is, it is not necessary to leave all the certification to outside bureaus. And, the identification requesting client 102 or 502 may make identification directly with the photograph attached to the specifying information (i.e. car license) of the person to be identified.

Moreover, as for the internal configuration of the identification device and card issuing device described in Embodiments 1~3, the present invention is not limited to these.

That is, the certification inputting section 104 and 504, condition inputting section 106 and 506, result outputting section 107 and 507 of Embodiments 1 and 3; or certification input output section 303 of Embodiment 2 are equipped inside of the identification devices 103, 503; or card issuing device 302. But, these may respectively equipped outside of the devices. And these may be connected respectively with the judging section via wired line or wireless line.

Moreover, it is described that the judging sections 108, 304 and 508, communicating sections 105, 305 and 505 are equipped in a unit identification device and card issuing device. But plural identification device and card issuing device may hold these in common.

Moreover, in Embodiments 1~3, it is described that each process is finished when error occurred. But recovery process may performed then. For example, when the password input mistake of the person to be identified caused an error, another password input may be allowed to continue succeeding processes.

Moreover, in Embodiment 2, it is described that the identification condition is set in advance. But a condition inputting section may be equipped as well as Embodiment 1 for the identification requesting client to set the identification condition.

What is claimed is:

1. An identification device which identifies a person to be identified according to at least two certification results given from at least two certification bureaus, said identification device comprising:
  a condition inputting section which specifies an identification condition to request the person to be identified to simultaneously present at least two certification cards;
  a certification inputting section which obtains respective certification information from the at least two certification cards, each certification information including personal data used for identifying the person and bureau data used for specifying a corresponding certification bureau;
  a judging section which judges whether the personal data corresponding to one of the at least two certification cards respectively corresponds to the personal data of another of the at least two certification cards, and if the personal data of the at least two certification cards are judged to be the same data, the judging section sends respective certification information of the at least two certification cards to the respective corresponding certification bureaus based on the respective bureau data of the certification information and performs a judgment with respect to the person to be identified on the basis of the at least two certification results given by the corresponding certification bureau;
  wherein the certification inputting section further makes the person to be identified input respective password numbers corresponding to the at least two certification cards;
  wherein the judging section further sends the respective password numbers to the corresponding certification bureaus together with respective certification information; and
  wherein each certification bureau sends the corresponding certification information and the corresponding password number.

2. An identification device according to claim 1 wherein the judging section gives a charge for identification to the result outputting section.

3. An identification device according to claim 2 wherein
the judging section decides a certification bureau where each certification information is given according to the address information of the certification bureau included in each certification information,
and gives each medium certification information to the decided corresponding certification bureau.

4. An identification device according to claim 2 wherein the condition inputting section is able to be inputted credit cards to satisfy the identification condition and a credit card is one kind of certification card.

5. An identification device according to claim 1 wherein;
the judging section decides a certification bureau where each certification information is given according to the address information of the certification bureau including in each certification information,
and gives each certification information to the decided corresponding certification bureau.

6. An identification device according to claim 1 wherein the condition inputting section is able to be inputted with credit cards to satisfy the identification condition and a credit card is one kind of certification card.

7. An identification system comprising
an identification device according to claim 1 and
at least one certification bureau connected with the identification device via a network.

8. An identification system according to claim 7 further comprising an insuring information center wherein the certification information is a company card of the person to be identified and a password number of the company card.

9. An identification device according to claim 1 wherein the certification information is a company card of the person to be identified and a password number of the company card.

10. An identification device according to claim 1 wherein the certification card is selected from the group comprising a credit card, a cash card, a car license or a passport.

11. An identification device according to claim 1 wherein the personal data includes the name of a person.

12. An identification device according to claim 1 wherein the bureau data includes the address information of the certification bureau associated with the certification card.

13. An identification method of identifying a person to be identified according to at least two certification results given from at least two certification bureaus, said identification method comprising:
a process of assigning an identification condition to request the person to be identified to simultaneously present at least two kinds of certification cards by an identification requesting client;
a process of inputting more than one kind of certification information from the at least two certification cards by the person to be identified where each certification information includes personal data used for identifying the person and bureau data used for specifying a corresponding certification bureau;
a process of judging whether the personal data corresponding to one of the at least two certification cards respectively corresponds to the personal data of another of the at least two certification cards;
a process of reading address information of a respective certification bureau included in the certification information so as to select the certification bureau corresponding to the certification information;
a process of offering the respective certification information to the at least two certification bureaus if the personal data corresponding to the at least two certificate cards are judged to be the same data where the respective certification bureau of the at least two certification cards performs a certification based on the received certification information and respectively outputs a certification result;
a process of identifying the person to be identified in the certification bureau, and
a process of presenting the identification requesting client the certification result so as to confirm identification.

14. An identification method according to claim 13, further comprising a process of presenting the identification requesting client a charge for identification, after the process of reading the address to select the certification bureau, and
judging whether the charge is reasonable or not by the identification requesting client and continuing the succeeding process or returning to the process of assigning condition based on whether the charge is reasonable or not.

15. An identification method according to claim 14 wherein the identification condition assigned by an identification requesting client is satisfied by more than one credit card and a credit card is one kind of certification card.

16. An identification method according to claim 14 wherein the identification condition assigned by an identification requesting client is satisfied by more than one cash card and a cash card is one kind of certification card.

17. An identification method according to claim 13 wherein the identification condition assigned by an identification requesting client is satisfied by more than one credit card and a credit card is one kind of certification card.

18. An identification method according to claim 13 wherein the identification condition assigned by an identification requesting client is satisfied by more than one cash card and a cash card is one kind of certification card.

19. A card issuing device which processes a card after a person has been identified according to at least two certification results given from at least two certification bureaus comprising:
a certification input section which obtains certification information from at least two certification cards input by a person to be identified, said certification information including personal data used for identifying the person and bureau data used for specifying a corresponding certification bureau;
a judging section which judges whether a card can be issued or not based on whether or not the personal data corresponding to the at least two certification cards are judged to be the same data, if they are the same data, the judging section offers the respective certification information of the at least two certification cards to the respective corresponding certification bureaus based on the respective bureau data; and
a card issuing section which issues a card according to the certification information when the judging section determines that the certification information is the information given by the person to be identified and provides the respective certification bureau with a certification result.

20. A card issuing system comprising
a card issuing device according to claim 19, and
an insuring information center which provides an insuring information of each individual person to be identified for judging whether a card is issuable or not.

21. A card issuing system according to claim 20 further comprising at least one certification bureau connected with the card issuing device, wherein the judging section judges whether a card is issuable or not according to the result obtained by the certification bureau.

22. A card issuing system according to claim 20 wherein the card to be issued is a credit card and the certification information is a cash card of the person to be identified and a password number of the cash card.

23. A card issuing system according to claim 22 wherein the insuring information is each individual information including each person's conduct data.

* * * * *